United States Patent
Steinhöfer et al.

(10) Patent No.: US 7,544,258 B2
(45) Date of Patent: Jun. 9, 2009

(54) METHOD OF FABRICATING PRESSED COMPONENTS

(75) Inventors: Detleff Steinhöfer, Schloss Holte-Stukenbrock (DE); Ralf Kolleck, Kronau (DE)

(73) Assignee: ThyssenKrupp Automotive AG, Bochum (DE)

( * ) Notice: Subject to any disclaimer, the term of this patent is extended or adjusted under 35 U.S.C. 154(b) by 353 days.

(21) Appl. No.: 10/848,598

(22) Filed: May 18, 2004

(65) Prior Publication Data
US 2004/0231762 A1    Nov. 25, 2004

(30) Foreign Application Priority Data
May 21, 2003   (DE)   ................... 103 22 928

(51) Int. Cl.
C21D 1/10   (2006.01)
C21D 1/00   (2006.01)

(52) U.S. Cl. ...................... 148/567; 148/575
(58) Field of Classification Search ............... 148/624, 148/567, 575
See application file for complete search history.

(56) References Cited

U.S. PATENT DOCUMENTS

| | | | | |
|---|---|---|---|---|
| 4,122,321 A | * | 10/1978 | Cachat | 219/650 |
| 4,798,931 A | * | 1/1989 | Hess, III | 219/121.64 |
| 4,826,138 A | * | 5/1989 | Coleman | 266/115 |
| 5,401,941 A | * | 3/1995 | Mauve et al. | 219/645 |
| 6,511,557 B2 | * | 1/2003 | Arvedi | 148/546 |
| 6,515,256 B1 | * | 2/2003 | Battaglia | 219/121.72 |
| 2003/0066581 A1 | | 4/2003 | Gehringhoff et al. | 148/624 |

FOREIGN PATENT DOCUMENTS

EP    130 0476    4/2003

OTHER PUBLICATIONS

The ASM Handbook vol. 1, "Classification and Basic Metallurgy of Cast Iron", pp. 3-11.*

* cited by examiner

Primary Examiner—John P. Sheehan
Assistant Examiner—Jessee R. Roe
(74) Attorney, Agent, or Firm—Proskauer Rose LLP

(57) ABSTRACT

A simpler and less expensive method of fabricating pressed components from sheet steel that can be heat treated while inside the press, whereby the material is heated to above its transformation point Ac3, pressed, and cooled, controlled, to below its crystalline-transformation point. The sheet is unwound from a coil (1), heated to above its transformation point, pressed in a press, and separated.

12 Claims, 1 Drawing Sheet

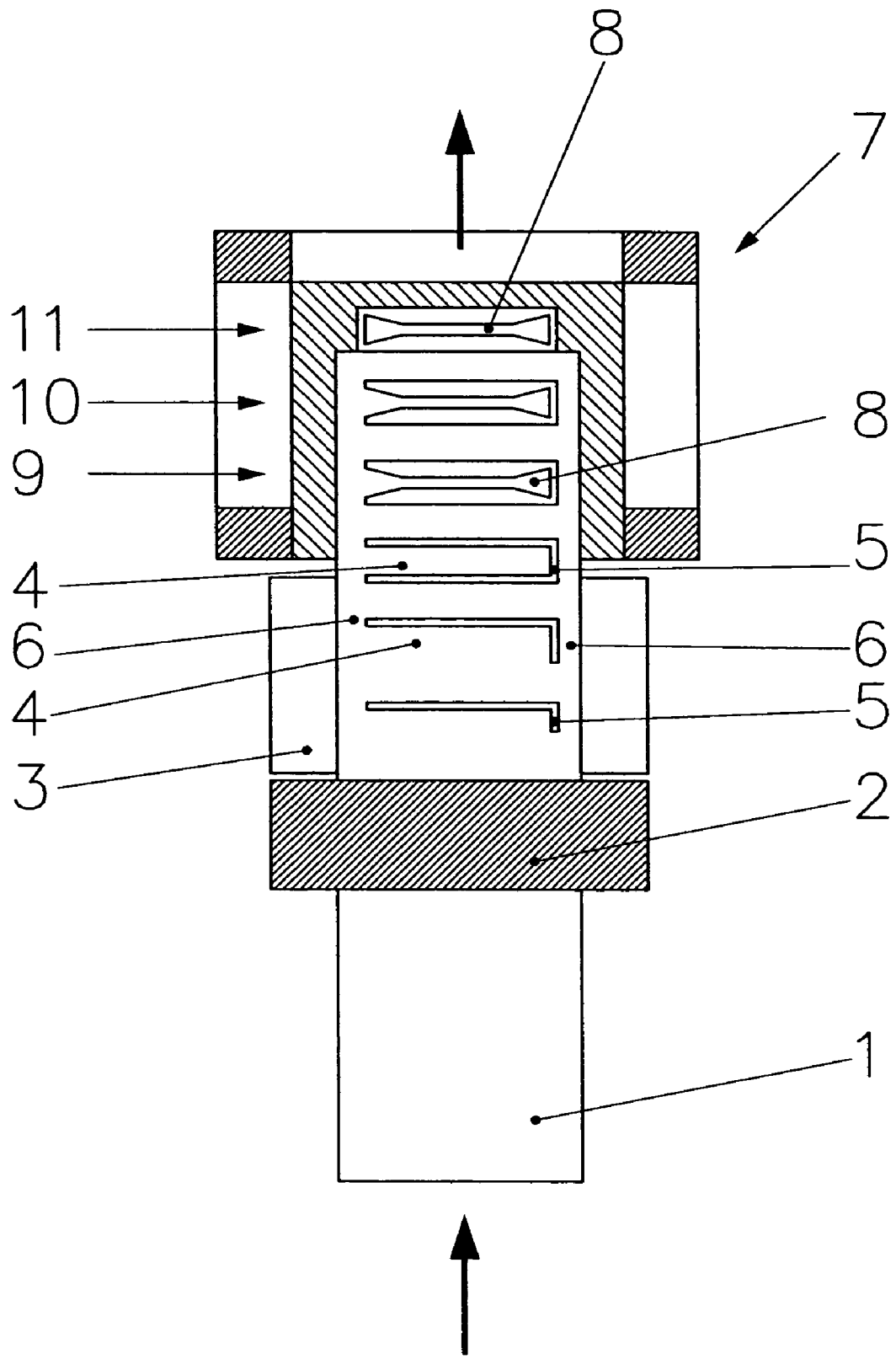

METHOD OF FABRICATING PRESSED COMPONENTS

RELATED APPLICATIONS

This application claims the benefit of and priority to German patent application no. DE 103 22 928.0-14, filed May 21, 2003, which is owned by the assignee of the instant application. The disclosure of the above application is incorporated herein by reference in its entirety.

BACKGROUND OF INVENTION

The present invention concerns a method of fabricating pressed components from steel sheet that can be heat treated while inside a press.

Components, especially components for the automotive industry, are increasingly being fabricated of sheet steel or steel structural section pressed and hardened in the press itself.

These steels may for example be composed of (in weight precent)
- carbon C 0.19-0.25
- silicon (Si) 0.15-0.50
- manganese (Mn) 1.10-1.40
- titanium (Ti) 0.020-0.050
- boron (B) 0.002-0.005
- aluminum (A) 0.02-0.06
- phosphorus (P)<0.025
- sulfur (S)<0.015
- chromium (Cr)<0.35
- molybdenum (Mo) 0.35 the remainder constituting iron (Fe), including contamination from smelting.

European Patent 1 300 476 A6 discloses fabricating such components from plates and structural section. There is, however, a drawback to this method. The plates and section must be heated to at least 750° C. in a continuous furnace before they can be inserted in the press. The process is accordingly complex and the equipment complicated.

SUMMARY OF INVENTION

The object of the present invention is accordingly a simpler method of fabricating pressed components from steel that can be heat treated while inside the press, while employing less complicated equipment.

The present invention features several advantages. First, in spite of the lower investment in equipment, the fabrication process can be considerably accelerated. Again, the method in accordance with the present invention is extremely flexible, allowing the fabrication of different shapes from the same coil with no need to readjust the whole furnace and all the conveying equipment as in the conventional approach using plates of various dimensions to obtain different-sized components. Furthermore, the equipment can be adapted later to handle uncoated sheet, the material being subjected to an inert atmosphere while in the press. Finally, the sheet can be cut while still hot, saving considerable wear on the cutter.

BRIEF DECRIPTION OF THE DRAWING

One embodiment of the present invention will now be specified by way of example with reference to the accompanying drawing, a single figure.

DETAILED DESCRIPTION OF THE INVENTION

A strip 1 of steel sheet has been wound into a coil on an unillustrated stand. Strip 1 is unwound from the coil as needed and straightened if necessary. The unwound and if necessary straightened strip is heated in a furnace 2 to a temperature above the material's transformation point $Ac_3$. Furnace 2 can be a transverse-field induction furnace for example, although a conventional gas-or-electrically heated furnace can be employed as an alternative. Downstream of furnace 2 is a holding section 3, where the strip is maintained at a temperature to be employed for further processing, e.g. above 850° C.

The holding section 3 in the illustrated example accommodates an unillustrated plane-traveling metal-cutting laser employed to produce a U-shaped cut 5 in plate 4. As will be evident from the schematic illustration, the cut is executed by a series of several parallel laser heads. Plate 4 is maintained fixed at one margin 6, and no manipulating mechanisms will be necessary to forward it into the downstream multiple-stage press 7. How plate 4 is fixed at the margin will be determined by one of skill in the art in accordance with the specific situation.

Other types of metal-cutting tools—saws or punches for example—can of course also be employed instead of a laser. A plate can alternatively be cut off the strip, in which event, however, a conveying mechanism will be needed to forward the hot plates to the different sections of multiple-stage press 7.

The schematically depicted component 8 in the present embodiment is a reinforcement of the type employed in the doors of motor vehicles to minimize damage in the event of lateral collision.

In the first processing section 9 of multiple-stage press 7, plate 4 is pressed into its intended shape and cooled in an unillustrated refrigerated press to below its crystalline transformation point, preferably in the present example to 450° C. The press is refrigerated with water and cools component 8 indirectly.

The component 8 in the illustrated embodiment is now cooled to approximately 50° C. in the second processing section 10 of multiple-stage press 7. This second cooling stage can be regulated or unregulated. The advantage of such multiple-stage cooling is that the timing can be distributed throughout the process, cutting the total fabrication time almost in half. The component can also be cooled in second processing section 10 by way of the refrigerated press, although it can also be cooled directly by air or by another coolant.

Component 8 is now, in a third processing section 11, completely separated from the plate at margin 6. The component can simultaneously or subsequently be bored or machined as necessary.

In another embodiment of the present invention, the component is heated inductively to a preliminary temperature in two steps and thereafter to a final temperature in a continuous furnace.

The sheet steel may also be coated steel sheet.

LIST OF PARTS 1. strip
2. furnace
3. holding section
4. plate
5. cut
6. margin 7. multiple-stage press
8. component
9. first processing section
10. second processing section
11. third processing section

The invention claimed is:

1. A method for fabricating shaped components from predetermined sheet steel that is heat treated while inside a press, comprising the steps of:
unwinding a strip of sheet steel from a coil;
introducing said strip into a heating furnace;
heating said strip inside said furnace to a temperature above transformation point Ac3;
cutting said strip to form a plate which is partially separated from said strip;
pressing in a refrigerated press said plate into an intended shape to form a shaped component;
cooling said shaped component indirectly by means of said refrigerated press to a temperature below the crystalline-transformation point while said strip is still connected to said shaped component, said shaped component becoming hardened by said cooling; and
separating said shaped component fully from said strip after said cooling.

2. A method as defined in claim 1, wherein said strip is heated in a continuous furnace.

3. A method as defined in claim 1, wherein said strip is heated inductively.

4. A method as defined in claim 3, wherein said strip is heated inductively by transverse-field heating.

5. A method as defined in claim 1, wherein said strip is heated inductively to a preliminary temperature in two steps and thereafter to a final temperature in a continuous furnace.

6. A method as defined in claim 1, wherein said separating comprises a first separating step prior to said pressing for leaving connections between said plate and said strip, and a second separating step after said pressing for separating said shaped component completely.

7. A method as defined in claim 6, wherein said first separating step is carried out before said strip has been heated.

8. A method as defined in claim 1, wherein said separating is carried out by a laser.

9. A method as defined in claim 1, wherein said cooling comprises a first cooling step for cooling to below the sheet steel's crystalline transformation point, and a second cooling step for cooling said sheet steel to substantially 50° C.

10. A method as defined in claim 9, wherein said second cooling step is a controlled cooling step.

11. A method as defined in claim 1, wherein said sheet is coated steel sheet.

12. A method as defined in claim 1, wherein said sheet steel is uncoated steel sheet subjected to an inert atmosphere at least before exposure to heat prior to said pressing.

* * * * *